(12) United States Patent
Holden

(10) Patent No.: US 7,937,689 B2
(45) Date of Patent: May 3, 2011

(54) METHOD, APPARATUS AND COMPUTER PROGRAM PRODUCT FOR DETERMINING A RELATIVE MEASURE OF BUILD QUALITY FOR A BUILT SYSTEM

(75) Inventor: Ian G Holden, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 11/872,218

(22) Filed: Oct. 15, 2007

(65) Prior Publication Data

US 2008/0104577 A1 May 1, 2008

(30) Foreign Application Priority Data

Oct. 27, 2006 (GB) ................................ 0621408.4

(51) Int. Cl.
*G06F 9/44* (2006.01)
(52) U.S. Cl. ...................................................... 717/126
(58) Field of Classification Search ................... 717/126
See application file for complete search history.

(56) References Cited

U.S. PATENT DOCUMENTS

| | | | |
|---|---|---|---|
| 6,601,017 B1 | 7/2003 | Kennedy et al. | |
| 6,668,340 B1 | 12/2003 | Baker et al. | |
| 6,799,145 B2 * | 9/2004 | Kennedy et al. | 714/38 |
| 2004/0063009 A1 * | 4/2004 | Phan et al. | 430/30 |
| 2005/0166094 A1 | 7/2005 | Blackwell et al. | |
| 2007/0006041 A1 * | 1/2007 | Brunswig et al. | 714/38 |
| 2007/0094189 A1 * | 4/2007 | Yamamoto et al. | 706/45 |

OTHER PUBLICATIONS

Aggrawal et al. "Code Coverage Based Technique For Prioritizing Test Cases For Regression Testing", Sep. 2004, ACM SIGSOFT, vol. 29.*
Nagappan et al. "Early Estimation of Software Quality Using In-Process Testing Metrics: A Controlled Case Study", May 2005, ACM.*
Stale Amland, "Risk Based Testing and Metrics", 5th International Conference, EuroSTAR '99, Nov. 8-12, 1999, Barcelona, Spain , www.amland.no/WordDocuments/EuroSTAR99Paper.doc.
Hans Schaefer, "Risk Based Testing, Strategies for Prioritizing Tests Against Deadlines",http://home.c2i.net/schaefer/testing.html, Software Test Consulting, Reigstad , N-5281 Valestrandsfossen ,Norway, 2005.

(Continued)

*Primary Examiner* — Wei Y Zhen
*Assistant Examiner* — Junchun Wu
(74) *Attorney, Agent, or Firm* — David A. Mims, Jr.

(57) ABSTRACT

Determining a relative measure of build quality for a built product based on analysis of historical test data from test cases applied to a series of builds of the built product, by identifying one or more first sets of test results, each first set of test results being derived from the application of a set of test cases to a series of builds of a built product; determining a test quality coefficient for each test case based on the respective test results from the first set of test results; identifying a second set of test results derived from the application of one or more of the test cases to a further build of the built product; applying each test quality coefficient to each corresponding test result from the second set; and calculating the mean of the second set of test results as qualified by their corresponding test quality coefficient.

20 Claims, 2 Drawing Sheets

OTHER PUBLICATIONS

Ian Holden, et al., "Improving Testing Efficiency using Cumulative Test Analysis", Testing: Academic and Industrial Conference—Practice and Research Techniques, 2006. TAIC Part 2006. Proceedings.
IBM, "Using dependency analysis to supplement code coverage for targeted testing", WWW.IP.COM, IPCOM000152907D, May 17, 2007.

IBM, "Prioritising testing based on Assessment of the possible impact of a given code change", WWW.IP.COM, IPCOM000150040D, Apr. 16, 2007.
IBM, "Integrated Match Specification Test Mechanism", WWW.IP.COM, IPCOM000134613D, Mar. 13, 2006.

* cited by examiner

METHOD, APPARATUS AND COMPUTER PROGRAM PRODUCT FOR DETERMINING A RELATIVE MEASURE OF BUILD QUALITY FOR A BUILT SYSTEM

FIELD OF INVENTION

The present invention relates to a method, apparatus and computer program product for determining a relative measure of build quality for a built system.

BACKGROUND

Many products are produced in successive builds or versions, with each build or version comprising modifications or improvements to the previous build. Testing of such built products commonly involves applying a set of one or more test cases to the product. The quality of the product can then be measured by the degree of the products success against the test cases. However, due to practical constraints, such as time and personnel availability, some testing may not be performed or may be abandoned, while other testing may not be fully effective or reliable. As a result, consistently measuring the quality of the product between subsequent builds is difficult.

SUMMARY

An embodiment of the invention provides a method for determining a relative measure of build quality for a built product, the method comprising the steps of:
a) identifying one or more first sets of test case results, each first set of test case results being derived from the application of a set of test cases to a series of builds of a built product;
b) determining a test quality coefficient for each test case based on the respective test results from the first set of test case results;
c) identifying a second set of test case results derived from the application of one or more of the test cases to a further build of the built product;
d) applying each test quality coefficient to each corresponding test case result from the second set; and
e) calculating the mean of the second set of test case results as qualified by their corresponding test quality coefficient, the mean providing a user a relative measure of the build quality of the further build of the built product.

The second set of test case results may be included in the first set for the determination of the or each test quality coefficient. Each test quality coefficient may be derived from the mean of the test case results for the respective test case. Each test quality coefficient may be the mean of the test case results when each test case result is modified by a running weight coefficient based on a time related feature of the respective test case results. Each test quality coefficient may be the product of the mean of the test case results when each result is modified by the running weight coefficient and the mean of the running weights. The mean of the test case results or the mean of the running weight coefficients may be a weighted mean, the weighted mean being weighted by the running weight coefficients.

The magnitude of each running weight coefficient may be proportional to the age of the test case result to which the running weight is applied. The magnitude of each running weight coefficient applied to a given test case result may be proportional to the frequency of the application to the built product of the corresponding test case. The magnitude of the running weight coefficients assigned to each test case result may be determined by a predetermined category assigned to a given application of the test case to one of the series of builds. Only test case results from a predetermined time period may be selected. Only test case results from test cases that have been applied to the built product more than a predetermined number of times may be selected.

A coefficient may be applied to the relative measure of build quality based on the proportion of all available test cases that have been applied to produce the or each set of test case results. A coefficient may be applied to the relative measure of build quality based on the application environment of the built product. The built product may be a software system.

Another embodiment provides an apparatus for determining a relative measure of build quality for a built product, the apparatus being operable to: identify one or more first sets of test case results, each first set of test case results being derived from the application of a set of test cases to a series of builds of a built product; determine a test quality coefficient for each test case based on the respective test results from the first set of test case results; identify a second set of test case results derived from the application of one or more of the test cases to a further build of the built product; apply each test quality coefficient to each corresponding test case result from the second set; and calculate the mean of the second set of test case results as qualified by their corresponding test quality coefficient, the mean providing a user a relative measure of the build quality of the further build of the built product.

A further embodiment of the invention provides a computer program product comprising a storage type computer readable medium having computer instructions of a program or a group of programs arranges to enable a programmable device or group of such devices to carry out a method for determining a relative measure of build quality for a built product, the method comprising the steps of:
a) identifying one or more first sets of test case results, each first set of test case results being derived from the application of a set of test cases to a series of builds of a built product;
b) determining a test quality coefficient for each test case based on the respective test results from the first set of test case results;
c) identifying a second set of test case results derived from the application of one or more of the test cases to a further build of the built product;
d) applying each test quality coefficient to each corresponding test case result from the second set; and
e) calculating the mean of the second set of test case results as qualified by their corresponding test quality coefficient, the mean providing a user a relative measure of the build quality of the further build of the built product.

Another embodiment of the invention provides an apparatus comprising computer program instructions stored in a program memory or a group of programs, arranged to enable a programmable device or group of such devices, for determining a relative measure of build quality for a built product, the apparatus being operable to: identify one or more first sets of test case results, each first set of test case results being derived from the application of a set of test cases to a series of builds of a built product; determine a test quality coefficient for each test case based on the respective test results from the first set of test case results; identify a second set of test case results derived from the application of one or more of the test cases to a further build of the built product; apply each test quality coefficient to each corresponding test case result from the second set; and calculate the mean of the second set of test case results as qualified by their corresponding test quality coefficient, the mean providing a user a relative measure of the build quality of the further build of the built product.

BRIEF DESCRIPTION OF THE DRAWINGS

Embodiments of the invention will now be described, by way of example only, with reference to the accompanying drawings in which.

DETAILED DESCRIPTION

Figure 1:
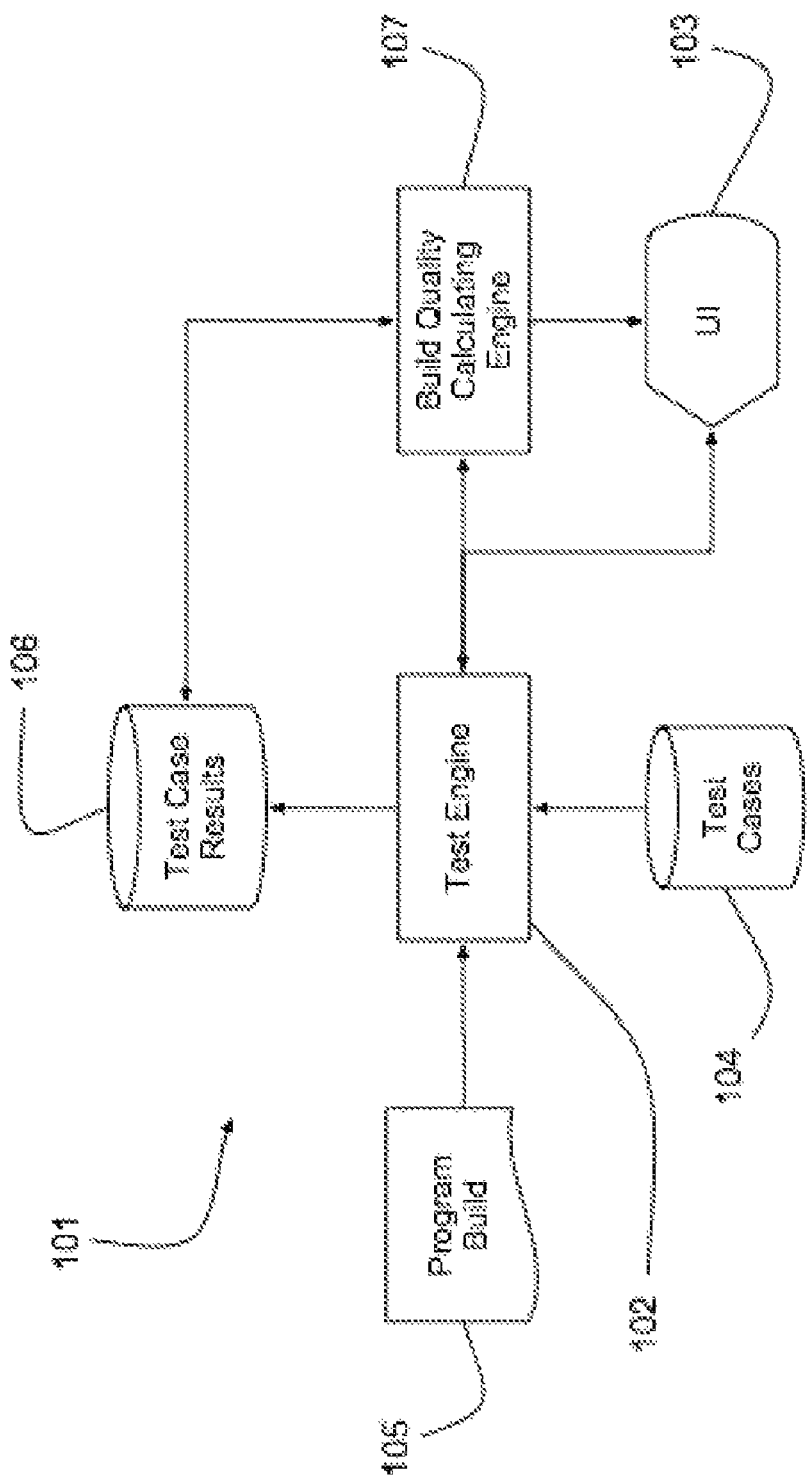
FIG. 1 is a schematic illustration of a product testing system.

With reference to FIG. 1, a product testing environment in the form of a software application program testing environment 101, provided by a test management and execution application program, comprises a test engine 102 connected to a user interface (UI) 103. The test engine is arranged to apply a set of stored test cases 104, to each of a series of product builds in the form of program builds 105 of a built product in the form of a software system. The test engine 102 produces and stores test case results 106 for each test case 104 applied for each of the series of builds 105. After a number of testing iterations, the test case results 106 provide a history of the testing of each test case against each build of the software system. The test engine 102 is controlled by a user via the UI 103, which is also used to view the test case results 106.

The test management and execution application program further comprises a build quality calculating engine (BQCE) 107 which is triggered by the completion of the testing of a program build 105 by the test engine 102. In response to this, the BQCE 107 is arranged to identify all the test case results 106 for the test cases 104 applied to the program build. Using these latest and historical test case results, the BQCE derives a measure of the quality of the latest program build relative to the historical program builds. This relative build quality (BQ) measure is supplied to the user via the UI 103.

The build quality for the latest build is defined as the mean value (mtr) of all of the test case results p from all of the test cases 104 that have been run on that build. In the present embodiment each test case result represents either a test pass or fail as a one or a zero respectively. Each result p from each applied test case is modified by a test quality coefficient produced by a test quality function. Each test quality coefficient has a value between one and zero, with one representing the highest quality. The test quality function is arranged to determine the test quality coefficient (tq) for a given test case from analysis of the historical test case results and is described further below. The relative build quality is defined as follows:

$$BQ = mtr = \text{mean}\{(p_{b1} \cdot tq_1), (p_{b2} \cdot tq_2), \ldots (p_{bn} \cdot tq_n)\}$$

where $p_{bn}$ indicates a test case result from running individual test case n on the latest build (b) and $tq_n$ is the corresponding test quality coefficient for the test case n.

The test quality function derives the test quality coefficients from a combination of all of the historical test case results for all applications for the test case to each of a series of builds of the software system and a set of running weights coefficients. The running weight coefficients have values between one and zero and are produced by a running weight function. In the present embodiment, the running weight function produces running weight coefficients that are dependent on a time based feature of the test case results. In other words, the running weight coefficients are inversely proportional to the age of a given test result. For example, the latest test result $p_n$ may be assigned a running weight coefficient of 1 and the oldest test result $p_1$ may be assigned a running weight coefficient close to zero. Thus the newer test results have a greater influence on the BQ measure.

In the present embodiment, the test quality is calculated using the weighted mean of all the historical test results for a given test as modified by their respective running weight coefficient. These weighted means are referred to herein as the weighted test case results wtr for each applied test. The weighted test case results are further modified by the weighted mean (wmw) of all of the running weight coefficients themselves. In other words, the test quality coefficient is the product of the weighted mean of the test case results and the weighted mean of the running weights where the weighted mean weights are the respective running weight coefficients. The test quality coefficient tq is defined as follows:

$$tq = wtr \cdot wmw$$

where:

$$wtr = \frac{\sum p \cdot rw}{\sum rw}$$

and:

$$wmw = \frac{\sum rw^2}{rw}$$

The following table shows a set of example test case results for the daily application of a single test to a software system:

| Test Day | Test Result p | Running Weight rw | Weighted Test Result p · rw | Weighted Weight rw · rw |
|---|---|---|---|---|
| 1 | 0 | 0.1 | 0 | 0.01 |
| 2 | 0 | 0.2 | 0 | 0.04 |
| 3 | 1 | 0.3 | 0.3 | 0.09 |
| 4 | 1 | 0.4 | 0.4 | 0.16 |
| 5 | 0 | 0.5 | 0.0 | 0.25 |
| 6 | 1 | 0.6 | 0.6 | 0.36 |
| 7 | 1 | 0.7 | 0.7 | 0.49 |
| 8 | 1 | 0.8 | 0.8 | 0.64 |
| 9 | 1 | 0.9 | 0.9 | 0.81 |
| 10 | 1 | 1.0 | 1.0 | 1.00 |
| Sums: | 7.00 | 5.50 | 4.70 | 3.85 |
| Means: | 0.70 | 0.55 | 0.47 | 0.39 |
| tq = 0.60 | | | wtr = 0.85 | wmw = 0.70 |

As noted above, the running weight function created a set of running weights rw, which are inversely proportional to the age of the test results, which applies less confidence or importance to the older results. The resulting test quality coefficient is 0.60, therefore, for the latest build of the software system, the contribution to the BQ value for this test would be 0.6 assuming the test passed on the build. As noted above, the overall build quality BQ is the mean of each of the results from all of the individual tests run on the build multiplied by their respective test quality coefficients tq. This BQ value can be compared to the BQ values of prior builds to provide a relative measure of the quality of each such build that enables improved or reduced test performance to be identified.

Figure 2:
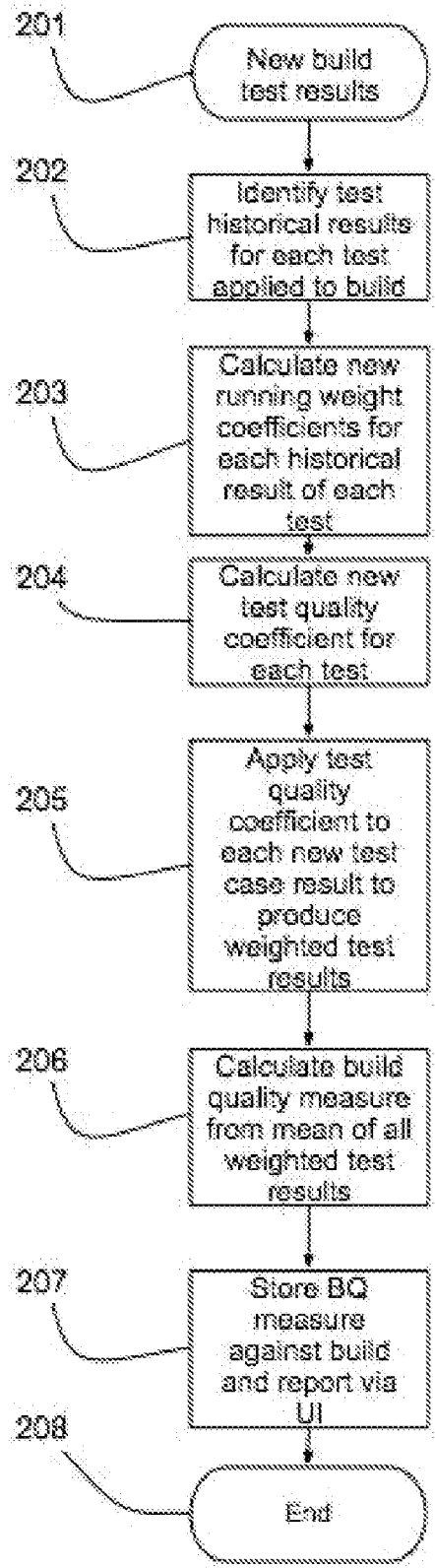
FIG. 2 is a flow chart illustrating processing carried out in the product testing system of FIG. 1.

The processing carried out by the BQCE when processing the BQ value will now be described further with reference to the flow chart of FIG. 2. At step 201, the BQCE receives an indication that new or further test results have been created for a new build of a given software system by the test engine 102 and processing moves to step 202. At step 202, the BQCE searches the historical test case results 106 to identify all of the test results for the test cases 104 that have been applied to the new build. Processing then moves to step 203 where a new running weight coefficient is calculated for each identified historical result of each applied test case. Processing then moves to step 204 where, based on the identified historical results and the new running weight coefficients, a new test quality coefficient is calculated for each applied test case. Processing then moves to step 205, where the new test quality coefficients are applied respectively to each new test result for each applied test case to produce a set of weighted test results for each applied test and processing moves to step 206. At step 206, the BQ measure is calculated from the mean of all of the weighted results for each of the applied tests. Processing then moves to step 207 where the new BQ measure is stored against the new build and reported to the user via the UI 103. Processing then ends at step 208. As described above, only the test results for prior or historical builds are used to determine the test quality coefficients tq for the new build. This enables the potentially time consuming task of calculating the test quality coefficients to be performed prior to the test result for the new or further build being available and thus reducing the time needed to produce the build quality value for the new build. In a further embodiment, the test case results for the new build are included in the calculations of the test quality coefficients for that build.

In another embodiment, the mean of the weighted test results mtr is further modified by a test proportion coefficient fptr relating to the proportion of all available test that were applied to a given build. For example, if ten test were available but only eight applied to a build then fptr=0.8 and BQ measure would be calculated as follows:

$$BQ = mtr \cdot fptr$$

In further embodiment, the mean of the weighted test results mtr is further modified by a build environment coefficient fec relating to the application environment of a particular build of the software system. For example, some environments may have different BQ thresholds to other environments. The build environment coefficient fec enables the BQ values for the same build to be adjusted depending on a given environment so that a common BQ value threshold may be used for judging builds across various application environments. The definition of the BQ value is as follow:

$$BQ = mtr \cdot fec$$

In another embodiment, wmw is omitted from the calculation of test quality coefficients tp so that tq=wtr. In a further embodiment, no running weight coefficients are used. In other words, standard means are used to calculate wtr, and wmw is redundant.

In a further embodiment, the running weight function is non linear. In another embodiment, the running weight function is arranged to produce running weight coefficients dependent on the frequency with which a test case has been applied. In a further embodiment, the running weight function is dependent on a category or status assigned to a particular build. For example, a build may be designated as a non-production build and the running weight function arranged to reduce the significance of the results of that build relative to those of a full production build. In another embodiment, a different running weight function is applied to the results of each test case. In a further embodiment, the same running weight function is applied to the results of every test case.

As will be understood by those skilled in the art, while the embodiments described above relate to the calculation of a build quality measure for a software system, this software system may be substituted for any other system or article which undergoes repeated builds or versions and whose performance is then tested against a set of test cases. Such articles may include complex articles such as computer equipment, aircraft or spacecraft or simpler articles such as buildings, mechanical tools or furniture. In summary any manufactured article or system could be tested under this regime using the described measure of relative build quality.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs.

Furthermore, any or all of the software used to implement the invention can be communicated via any suitable transmission or storage means so that the software can be loaded onto one or more devices.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method in a data processing system of determining a relative measure of build quality for a built product, said method comprising the steps of:
   a) identifying one or more first sets of test case results, each said first set of test case results being derived from the application of a set of test cases to a series of builds of a built product;
   b) determining a test quality coefficient for each said test case based on the respective test results from said first set of test case results;
   c) identifying a second set of test case results derived from the application of one or more of said test cases to a further build of said built product;
   d) applying each said test quality coefficient to each corresponding said test case result from said second set; and
   e) a processor for use in calculating the mean of said second set of test case results as qualified by their corresponding test quality coefficient, said mean providing a user a relative measure of the build quality of the further build of said built product.

2. A method according to claim 1 in which said second set of test case results is included in said first set for said determination of the or each said test quality coefficient.

3. A method according to claim 1 in which each said test quality coefficient is derived from the mean of said test case results for said respective test case.

4. A method according to claim 3 in which each said test quality coefficient is the mean of said test case results when each said test case result is modified by a running weight coefficient based on a time related feature of said respective test case results.

5. A method according to claim 3 in which each said test quality coefficient is the product of said mean of said test case results when each said result is modified by said running weight coefficient and the mean of said running weights.

6. A method according to claim 4 in which said mean of said test case results or said mean of said running weight coefficient is a weighted mean, said weighted mean being weighted by said running weight coefficient.

7. A method according to claim 4 in which a magnitude of each said running weight coefficient is proportional to the age of said test case result to which said running weight is applied.

8. A method according to claim 4 in which a magnitude of each said running weight coefficient applied to a given test case result is proportional to the frequency of the application to said built product of the corresponding test case.

9. A method according to claim 4 in which a magnitude of said running weight coefficient assigned to each test case result is determined by a predetermined category assigned to a given application of said test case to one of said series of builds.

10. A method according to claim 1 in which only test case results from a predetermined time period are selected.

11. A method according to claim 1 in which only test case results from test cases that have been applied to said built product more than a predetermined number of times are selected.

12. A method according to claim 1 in which a coefficient is applied to said relative measure of build quality based on a proportion of all available test cases that have been applied to produce the or each said set of test case results.

13. A method according to claim 1 in which a coefficient is applied to said relative measure of build quality based on an application environment of said built product.

14. Apparatus for determining a relative measure of build quality for a built product, said apparatus by processor being operable to:
   identify one or more first sets of test case results, each said first set of test case results being derived from the application of a set of test cases to a series of builds of a built product;
   determine a test quality coefficient for each said test case based on the respective test results from said first set of test case results;
   identify a second set of test case results derived from the application of one or more of said test cases to a further build of said built product;
   apply each said test quality coefficient to each corresponding said test case result from said second set; and
   calculate the mean of said second set of test case results as qualified by their corresponding test quality coefficient, said mean providing a user a relative measure of the build quality of the further build of said built product.

15. Apparatus according to claim 14 in which said second set of test case results is included in said first set for said determination of the or each said test quality coefficient.

16. Apparatus according to claim 14 in which each said test quality coefficient is derived from the mean of said test case results for said respective test case.

17. Apparatus according to claim 16 in which each said test quality coefficient is the mean of said test case results when each said test case result is modified by a running weight coefficient based on a time related feature of said respective test case results.

18. Apparatus according to claim 16 in which each said test quality coefficient is the product of said mean of said test case results when each said result is modified by said running weight coefficient and the mean of said running weights.

19. Apparatus according to claim 17 in which said mean of said test case results or said mean of said running weight coefficient is a weighted mean, said weighted mean being weighted by said running weight coefficient.

20. A non-transitory computer program product comprising a computer readable medium having program instructions stored on the computer readable medium, the computer program instructions providing a method in a data processing system of determining a relative measure of build quality for a built product, said method comprising the steps of:
   a) identifying one or more first sets of test case results, each said first set of test case results being derived from the application of a set of test cases to a series of builds of a built product;

b) determining a test quality coefficient for each said test case based on the respective test results from said first set of test case results;
c) identifying a second set of test case results derived from the application of one or more of said test cases to a further build of said built product;
d) applying each said test quality coefficient to each corresponding said test case result from said second set; and
e) calculating the mean of said second set of test case results as qualified by their corresponding test quality coefficient, said mean providing a user a relative measure of the build quality of the further build of said built product.

* * * * *